United States Patent [19]

Bratton

[11] Patent Number: 4,581,055
[45] Date of Patent: Apr. 8, 1986

[54] HEAT SHIELD FOR REFRACTORY TUBE IN MOLTEN GLASS FEEDER

[75] Inventor: Kenneth L. Bratton, Windsor, Conn.

[73] Assignee: Emhart Corporation, Farmington, Conn.

[21] Appl. No.: 722,278

[22] Filed: Apr. 11, 1985

[51] Int. Cl.$^4$ .............................................. C03B 7/08
[52] U.S. Cl. ...................................... 65/328; 65/330; 65/331
[58] Field of Search .................. 65/328, 330, 331, 332

[56] References Cited

U.S. PATENT DOCUMENTS

| | | | |
|---|---|---|---|
| 1,792,932 | 2/1931 | Rule | 65/331 X |
| 2,039,242 | 4/1936 | Honiss | 65/332 X |
| 3,582,309 | 6/1971 | Bracken | 65/328 |
| 4,328,023 | 5/1982 | Vilk | 65/328 |
| 4,478,631 | 10/1984 | Mumford | 65/328 X |

*Primary Examiner*—Arthur Kellogg
*Attorney, Agent, or Firm*—McCormick, Paulding & Huber

[57] ABSTRACT

A heat shield for the refractory tube in a molten glass feeder has an annular metal shell with semi-circular insulating segments stacked therein. The shell is made in half sections to permit easy removal and the segments are provided in sets with relieved areas to accommodate the reciprocating refractory plungers.

7 Claims, 5 Drawing Figures

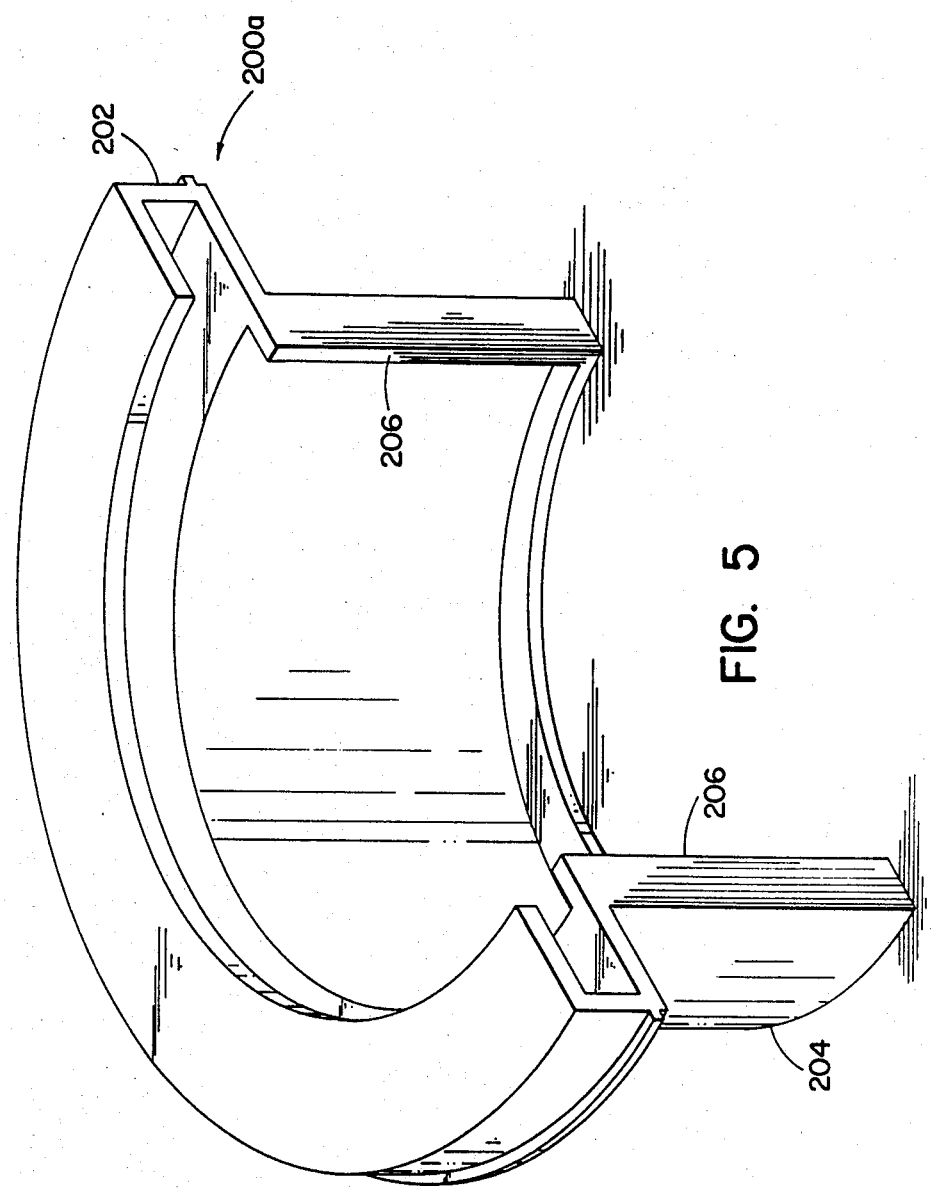

HEAT SHIELD FOR REFRACTORY TUBE IN MOLTEN GLASS FEEDER

This invention relates generally to maintaining a desired temperature of the molten glass in a feeder of the type having reciprocating plungers operating inside a refractory tube that is adapted to rotate inside a feeder bowl. More particularly, this invention relates to a heat shield for the upper end of such a refractory tube to reduce heat losses and thereby facilitate closer control of the molten glass temperature, and hence viscosity, in the feeder bowl, and thereby enhance the consistency of the glass gobs produced at the outlet of the feeder bowl.

BACKGROUND OF THE INVENTION AND CROSS REFERENCE TO RELATED APPLICATIONS

In a glass plant molten glass is supplied to the glassware forming machines through a heated forehearth channel, and a feeder is provided at the downstream end of the forehearth channel in order to form gobs of glass for delivery to the various sections of a typical glassware forming machine. The feeder has a plurality of side-by-side vertically reciprocating refractory plungers and the lower end of each plunger is generally associated with an orifice defined in the lower portion of the feeder bowl into which the molten glass is received from the forehearth. An annular refractory tube surrounds the plungers and extends downwardly into the molten glass so that the bottom of the tube can cooperate with an annular seating surface inside the feeder bowl to interrupt the flow of glass when the feeder is to be shut down. During normal operation of the feeder this tube is raised to some predetermined height and rotates in the feeder bowl providing a passageway between its lower end and the feeder bowl through which the molten glass flows toward the orifices. The refractory tube is supported for rotation on its central axis in a frame which can be raised or lowered, and the frame is generally provided with means for rotating the refractory tube, which means includes an annular bevelled gear provided coaxially with the refractory tube. In a copending application entitled "Molten Glass Spout Bowl Refractory Tube Support Mechanism", Ser. No. 655,502, filed Sept. 27, 1984 now U.S. Pat. No. 4,554,000 such a mechanism is described in some detail. Another copending patent application Ser. No. 616,638 filed June 4, 1984 now U.S. Pat. No. 4,551,163 and entitled "Electronic Glass Feeder Plunger Operating Mechanism" describes in some detail the mechanism for operating the verticaly reciprocating refractory plungers. These two pending patent applications are incorporated by reference herein.

The present invention relates to an improved heat shield fitted to the upper end of the refractory tube, surrounding the vertically reciprocating plungers, and designed to reduce heat loss from the molten glass in the feeder bowl without interfering with vertical movement of the plungers, and rotating movement of the refractory tube.

Issued U.S. Pat. No. 4,328,023 shows a molten glass feeder having a refractory heat shield inside a refractory tube to reduce the exposed area above the molten glass in the feeder bowl and reduce heat loss. However, this prior art patent suggests a one-piece cast refractory shield which cannot be removed without first withdrawing the refractory plungers.

Issued U.S. Pat. No. 4,478,631 shows a molten glass feeder having heat baffles of refractory material provided inside a refractory tube to reduce the exposed area above the molten glass in the feeder bowl and avoid excessive heat loss. However, two unconnected heat baffles of cumbersome size are provided alongside the plungers in this prior art patent and because they are fabricated soley from refractory material these baffles must be designed to fit rather loosely inside the rotating refractory tube itself. The present invention represents an improvement over these prior art patents, and also provides advantages when utilized in a feeder of the type referred to in the above-identified pending patent applications. For example, both prior art configurations require different installations for different size refractory tubes. This requirement is obviated in the subject disclosure.

SUMMARY OF THE INVENTIONS

This invention resides in a molten glass feeder having a refractory feeder bowl or spout and several side-by-side orifices defined in the outlet portion of the bowl so that the lower ends of several vertically reciprocating plungers are adapted to cooperate with these orifices to produce molten glass gobs for delivery to a glassware machine. A refractory tube is provided in the feeder bowl and surrounds the lower refractory portions of the plungers. This tube is supported for rotation in a frame that has an opening to receive the tube and the tube, in turn, permits the plungers to be provided inside it so that upper portions of the plunger are secured in a plunger support structure that provides for vertical movement of the plungers in timed relationship to operation of the other components of the glassware forming machine and of other elements of the feeder to produce the glass gobs in an accurately controlled manner.

In accordance with the present invention a generally tubular metal sheath means is provided above the refractory tube, and this sheath means has a through opening of at least the same circular area as that of the inside of the refractory tube. This sheath is preferably fabricated from two mating half sections or shells such that these half sections are readily removable from their position in the frame above the refractory tube without necessity for removal of the plungers. A plurality of insulatory semi-circular segments are stacked in sets inside the sheath means to a depth of at least, approximately one-half the inside diameter of the refractory tube. Each insulatory semi-circular segment has a diametrically extending edge abutting another diametrically extending edge of a corresponding semi-circular segment in a particular set, that is, each segment in the set is a mirror image of the other and they abut each other along a diametrically extending edge. Each such diametrically extending edge is relieved to accommodate the side-by-side reciprocating plungers normally provided in the feeder itself. These semicircular insulatory segments are fabricated from an insulating material and prferably the lowermost set is fabricated from a refractory material not unlike that provided in the components which are in direct contact with the molten glass in the feeder. The metal sheath is also preferably, made in sections and the upper portions of each section define an enlarged collar, which collar is received in an opening defined for it in housing associated with the frame that supports the refractory tube. In this manner, the heat shield of the present invention is conveniently supported from the frame and its housing, which are provided for support of the refractory tube itself. Furthermore, the heat shield does not interfere with rotation of the refractory tube during normal operation of the feeder.

BRIEF DESCRIPTION OF THE DRAWINGS

FIG. 5 is a perspective view illustrating one of the two half shells comprising the sheath means of the heat shield.

DETAILED DESCRIPTION

Figure 1:
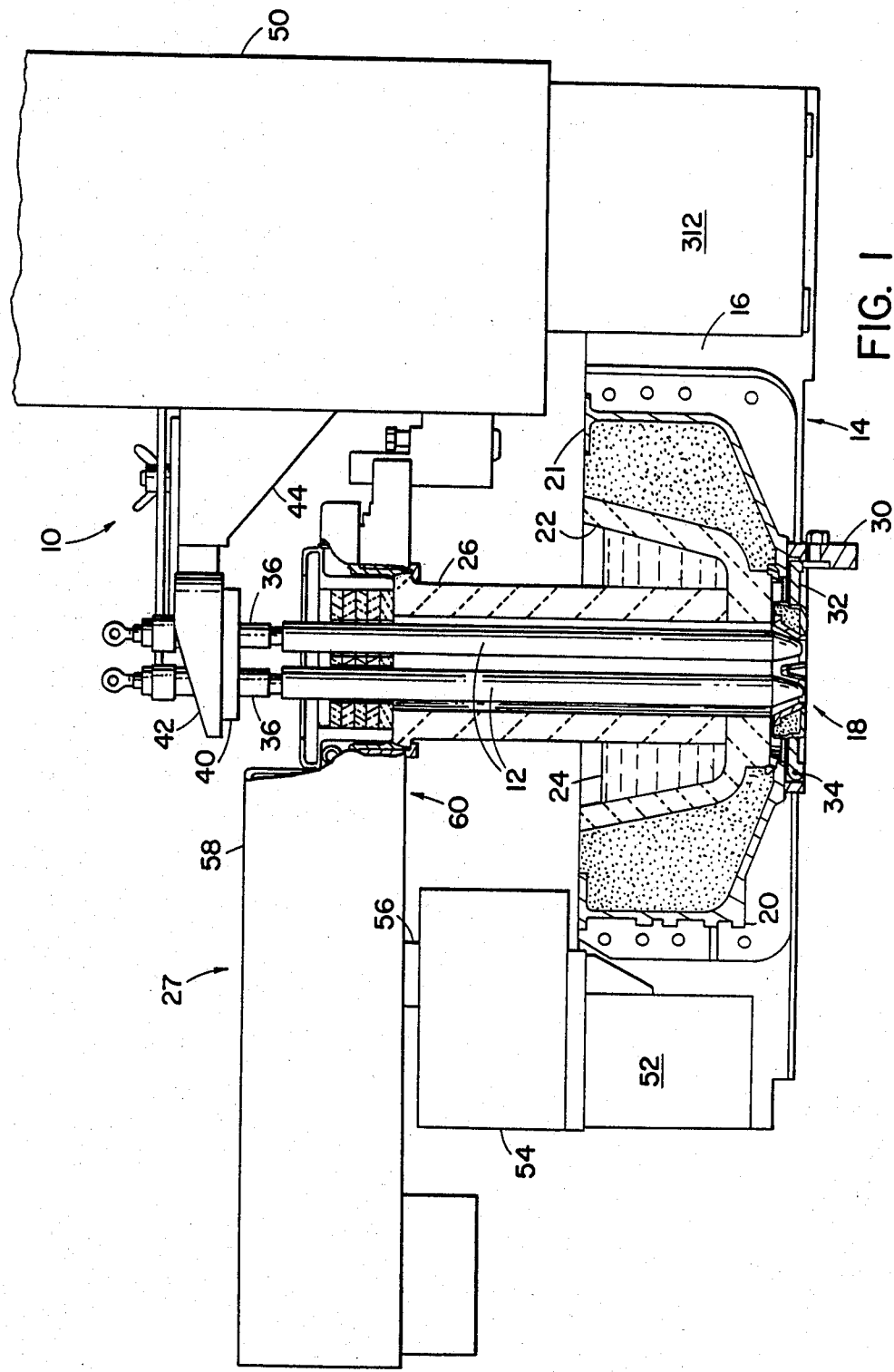
FIG. 1 is an elevational view with portions shown broken away or in vertical section illustrating the heat shield of the present invention installed in a feeder of the type described in the above mentioned pending patent applications.

Turning now to the drawings in greater detail, FIG. 1 shows in elevation, and partly in vertical section, a plunger operating mechanism indicated generally at 10 constructed in accordance with the disclosure in the above mentioned pending patent application entitled "Electronic Glass Feeder Plunger Operating Mechanism", Ser. No. 616,638, filed June 4, 1984 and incorporated by reference herein. As disclosed in that application glass feeder plungers 12, 12 reciprocate vertically relative to orifices defined in an orifice ring 18 so as to form gobs of molten glass for delivery to a glassware machine (not shown). Molten glass moves toward the viewer in FIG. 1 from a forehearth furnace 14 into a feeder bowl 22, which bowl is provided with molten glass to the level indicated generally at 24 from the furnace forehearth. The forward end 16 of the furnace forehearth supports the feeder bowl 22 and other components of the feeder mechanism to be described.

The plunger operating mechanism 10 is mounted by means of bracket 312 to the front end of the furnace forehearth 16, and the feeder bowl casing 21 is of conventional configuration being provided with a peripherally extending gib 20 to which may be mounted the shear mechanism (not shown) in accordance with conventional practice. Still with reference to the front end of the furnace forehearth bracket 52 supports a refractory tube operating mechanism 27 described in detail in another copending patent application entitled "Molten Glass Spout Bowl Refractory Tube Support Mechanism", filed Sept. 27, 1984 under Ser. No. 655,502 and also incorporated by reference herein. The refractory tube is indicated generally at 26 in FIG. 1 and is fabricated from a refractory material as is the feeder bowl 22 and lower end portions of the plungers 12, 12. As a result, all materials in direct contact with the molten glass are adapted to withstand the temperatures of the molten glass. The refractory tube 26 normally rotates in the position shown, that is such that the lower end thereof is spaced slightly above an annular seating surface provided for this purpose inside the feeder bowl 22. Thus, refractory tube 26 allows molten glass to flow toward the orifices in the orifice plate 18. The tube 26 is also adapted to be lowered so as to seal the molten glass from the area of the orifices as described in the last above mentioned pending patent application. The actual spacing provided between the lower end of the tube 26 and the inside of the feeder bowl will determine the flow rate of the molten glass to these orifices. The orifice plate also comprises a refractory element which is held in a super-insulating material and surrounded by a shell-like protective housing in accordance with conventional practice. Furthermore, the orifice plate is conventionally mounted in a pivoted holder or frame so that orifice plate support structure 32 can be pivoted downwardly from the position shown, about the axis of pivot pin 34 to a depending position for removal or replacement of the orifice plate. Latching mechanism 30 is provided for securing the orifice plate support structure 32 in the position shown.

The plungers 12, 12 are secured in plunger chucks 36, 36 and the plunger chucks are in turn mounted in a plunger carrier disk 40. As described in the first above mentioned pending patent applications, this carrier disk 40 is attached to a plunger holder or banjo frame 42, the banjo frame being in turn secured to a bracket 44 that is connected to mechanism inside housing 50 for raising and lowering the plungers in timed relationship with movement of other components of the feeder and of the glassware machine itself. As so constructed and arranged the plungers have lower end portions that cooperate with the orifices in the orifice plate 18 to cause molten glass gobs to issue from these orifices so that the gobs can be fed to the various individual sections of a conventional glassware forming machine. The refractory tube 26 rotates in the position shown for it in FIG. 1 so as to maintain the molten glass in a homogeneous state as the glass travels from the forehearth channel (not shown) toward the orifices in the orifice plate 18. The temperature of the molten glass is directly related to its viscosity and hence it is important in the formation of the glass gobs to maintain an optimum temperature in the feeder bowl, and particularly in the area of the feeder bowl where the vertically reciprocating plungers are operating to form the glass gobs.

The present invention relates to a heat shield for the upper end of the refractory tube the purpose of which is to reduce heat losses from the molten glass inside the refractory tube as a result of radiation and convection upwardly through the normally open area provided between the upper end of the refractory tube and the vertically reciprocating plungers. In its presently preferred form the improved heat shield of the present invention is provided above the upper end of the refractory tube, rather than inside this refractory tube as is the case with prior art configurations, but which heat shield is nevertheless supported from the frame and housing structure containing the means for rotating the refractory tube.

As described in the above mentioned pending patent application entitled "Molten Glass Spout Bowl Refractory Tube Support Mechanism" the refractory tube mechanism is provided on bracket 52 at the front end of the forehearth and more particularly on a vertically extending pivot post 56 which is mounted in a support structure 54 such that the refractory tube support mechanism in housing 58 can be raised and lowered as referred to previously. The means for rotating the refractory tube is provided within housing 58 and more particularly is supported on a horizontally extending frame 60 described in some detail in said pending patent application.

Figure 2:
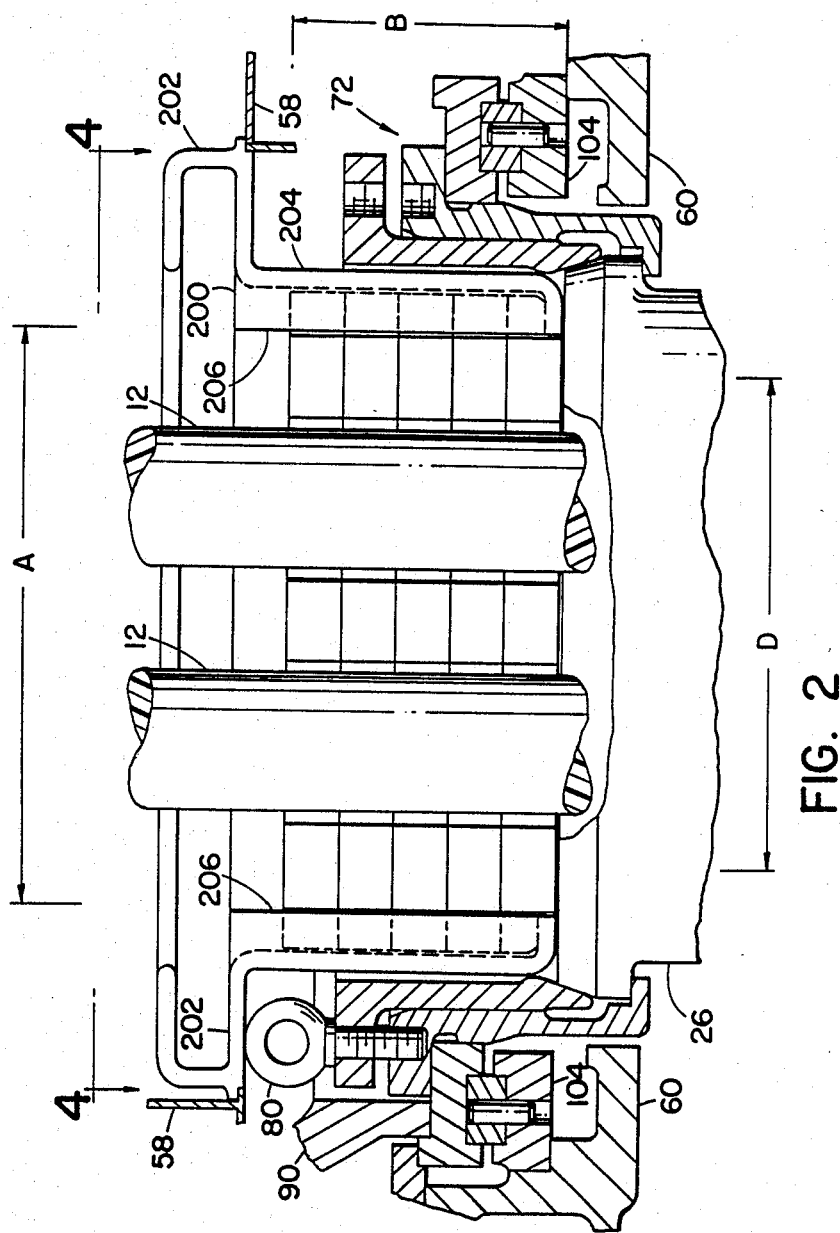
FIG. 2 is an enlarged view taken through the same improved heat shield of FIG. 1 where the refractory tube mechanism and the plungers are shown broken away.

FIG. 2 shows a portion of this frame 60 for supporting an annular bearing 104 in which the refractory tube chucking means is rotatable provided. This chucking means is indicated generally at 72 and comprises cooperating annular shaped members adapted to be clamped axially onto the flange provided for this purpose on the outside of the refractory tube 26. An annular bevel gear 90 is provided on the annular bearing for so rotating the refractory tube in response to rotation of a drive gear (not shown) but described in some detail in said pending patent application. FIG. 2 illustrates in pertient part the portion of the housing means associated with the frame 60 for the refractory tube support mechanism. This housing 58 defines an opening through which the refractory tube can be conveniently removed for replacement or repair. One of three eye-bolts is illustrated at 80 in FIG. 2 for serving this purpose. These bolts 80, 80 also serve to clamp the annular chucking means 72 axially as referred to previously. Still with reference to FIG. 2 the location for the vertically reciprocating refractory plungers 12, 12 is also shown in this view as is the heat shield to be described.

In its presently preferred form the heat shield comprises a generally tubular metal sheath means 200 provided above the refractory tube and including an upper collar portion 202 which serves to support the sheath 200 from the housing means 58 associated with the refractory tube support mechanism. The tubular sheath means 200 also includes a depending portion 204 of generally cylindrical external configuration and adapted to fit inside the refractory tube chucking mechanism 72. This portion 204 of the sheath means 200 defines a generally cylindrical inner diameter which defines a cross sectional area at least as great as the inside circular area of the refractory tube itself. Preferably, this inside diameter of the portion 204 of the sheath means is somewhat greater in cross sectional area than that of the inside of the refractory tube. For comparison purposes the dimension D in FIG. 2 illustrates the inside diameter of the refractory tube, and the dimension A illustrates the inside diameter of the portion 204 of sheath means 200. The axial extent of this depending portion 204 of the sheath means 200 is preferably such that it is at least, approximately equal to one-half the dimension A, and this geometry is deemed important to provide adequate insulating material in this sheath means portion 204 to assure that the desired reductions in heat loss in this area of the feeder can be achieved.

Figure 3:
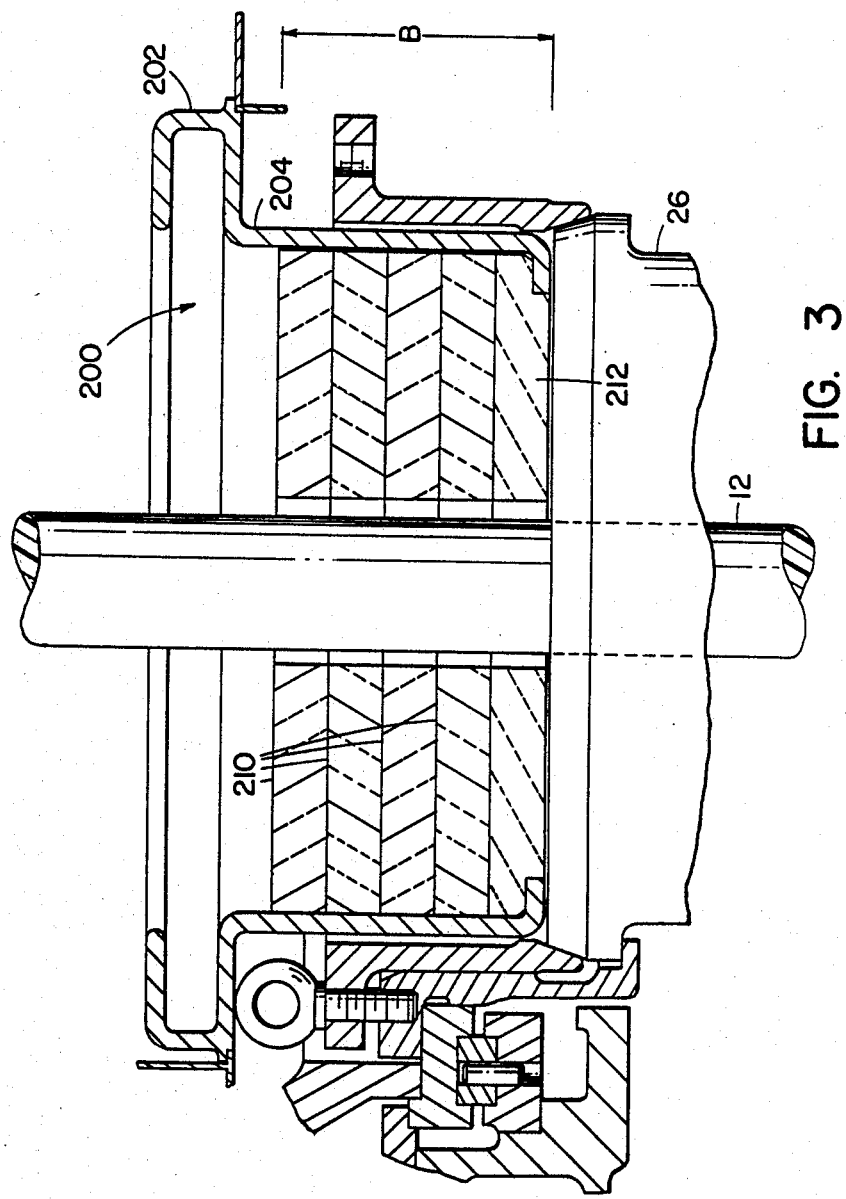
FIG. 3 is a vertical section taken generally on the line 3—3 of FIG. 4.

Turning next to FIG. 3, which view is also a vertical section but taken on a line oriented at substantially right angles to that of FIG. 2, the tubular sheath means 200 and more particularly the depending portion 204 thereof is there provided with at least two and preferably four layers of insulating material 210, 210. The lowermost layer 212 of insulating material is preferably a refractory material similar to that used in the fabrication of the refractory tube 26 and plungers 12. It is important to note that the total vertical height B for these insulating layers is at least approximately equal to one-half the inside diameter of the refractory tube. The layers 210 are preferably fabricated from a non-refractory material such as the super-insulation used in areas of a feeder or forehearth furnace not in direct contact with the molten glass. Layer 212, however, is preferably fabricated from a refractory material.

Figure 4:
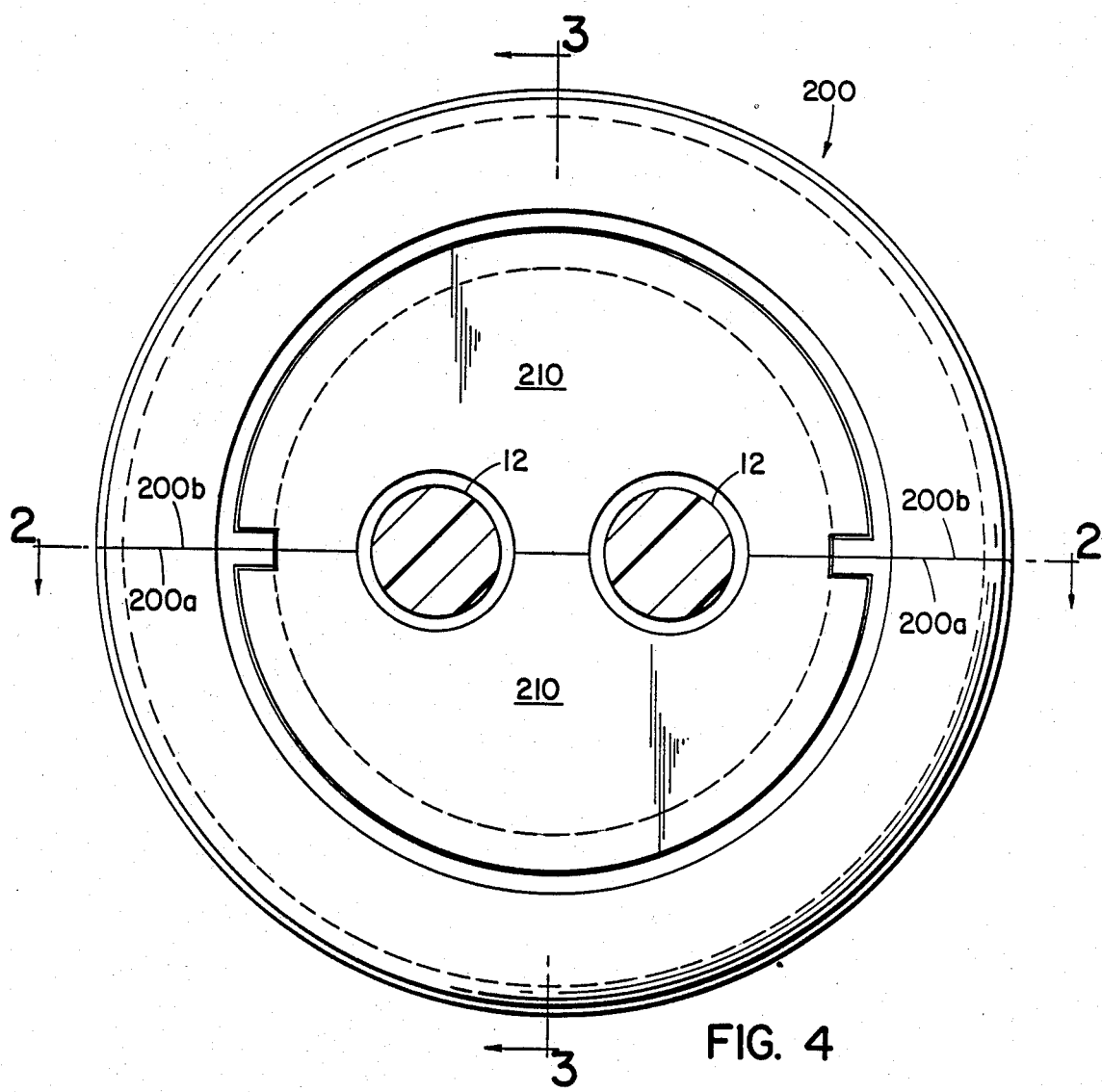
FIG. 4 is a horizontal section taken generally on the line 4—4 of FIG. 2, and FIG. 4 also serves to illustrate the relative orientations of the sectional views in FIGS. 2 and 3.

Turning now to a more detailed description of the sheath means 200, FIG. 4 illustrates in plan view the makeup of the tubular heat shield 200 as two mating half section or shells 200a and 200b which shells or sections cooperate to define the tubular shell means 200. Each such half-shell section is a mirror image of the other. FIG. 5 shows one such shell section 200a and from this view it will be apparent that the collar defining portion 202 extends radially outwardly beyond the depending portion 204, and that the latter includes radially inwardly extending walls 206 which cooperate with one another to define locating or indexing devices for receiving notches defined for this purpose in the semi-circular insulating segments 210, 210. As best shown in FIG. 3 four mating sets of insulating segments are stacked on top of a lower refractory set of segments 212. The use of individual segments of convenient thickness facilitates removal of these segments 210, 212 independently of the sheath shell sections 200a and 200b if desired.

As so constructed and arranged a readily removable heat shield is provided for the upper end of the refractory tube in a glassware feeder of the type having several plungers aligned in side-by-side relationship all in accordance with the feeder geometry disclosed in the above-identified pending applications. Present day heat shields are generally fabricated from refractory material which is by nature a rather poor insulator, and susceptible to cracking. The use of separate sections or segments provided in sets in the heat shield geometry described herein provides a very convenient construction that is well adapted for removal for replacement or repair of the various feeder components. The heat shield disclosed herein need not be bolted or otherwise secured to the top of the refractory tube mechanism as shown for the prior art heat shields referred to previously. The improved geometry faciliates the repair and maintence of the refractory tube mechanism. Furthermore, the insulation elements themselves are not attached to the metal sheath or shell structure, which sheath can fit closely into an opening provided for this purpose in the housing for the refractory tube support frame. Furthermore the heat shield is designed to improve control of the temperature in the molten glass and hence viscosity of the glass leading to more accurate gob weight control. This improvement in uniformity of gob production leads to advantages in the production of the glassware from these gobs and of course the presence of a heat shield located as described herein also leads to lower energy costs in the glassware plant itself.

I claim:

1. In a molten glass feeder having a bowl with several side-by-side orifices defined in the bowl, vertically reciprocable plungers with lower refractory portions cooperable with the orifices to produce glass gobs, a refractory tube surrounding these lower refractory plunger portions and supported for rotation in a frame that has an opening to receive the tube and the plungers inside the tube having upper portions above the tube, the improvement comprising:
  (a) a generally tubular metal sheath means provided above the refractory tube and having a through opening of at least the same circular area as that of the inside of the refractory tube,
  (b) a plurality of insulatory semi-circular segments stacked in sets inside said sheath means to a depth of at least approximately one-half the diameter of said circular opening, (c) each segment having a diametrically extending edge abutting another segment of its set that is a mirror image thereof, and said abutting edges being relieved to accommodate the plungers.

2. The combination of claim 1 wherein said tubular sheath means is defined by two mating half sections or shells such that they and the semi-circular insulatory segments are removable without necessity for removal of the plungers.

3. The combination of claim 1 wherein at least two sets of half circular segments are provided in stacked relationship within said tubular sheath means, the lowermost set being of refractory material.

4. The combination of claim 2 wherein at least two sets of half circular segments are provided, the lowermost set being of refractory material.

5. The combination of claim 2 wherein said shell half sections have upper portions defining an enlarged collar, and housing means for said refractory tube frame, said housing means having a through opening to provide clearance opening for removal of the refractory tube and said collar portion received on said frame housing means and soley supported therefrom.

6. The combination of claim 2 wherein said collar means further includes an inwardly extending peripheral portion spaced above said collar portion so supported on said frame housing means and serving as a convenient portion for manual removal of said shells.

7. In a molten glass feeder having a bowl with several side-by-side orifices defined in the bowl, vertically reciprocable plungers with lower refractory portions cooperable with the orifices to produce glass gobs, a refractory tube surrounding these lower refractory plunger portions and supported for rotation in a frame that has an opening to receive the tube and the plungers inside the tube having upper portions above the tube, the improvement comprising:

(a) a generally tubular metal sheath means provided above the refractory tube and having a through opening of at least the same circular area as that of the inside of the refractory tube, (b) a plurality of insulatory semi-circular segments stacked in sets inside said sheath means, (c) each segment having a diametrically extending edge abutting another segment of its set that is a mirror image thereof, and said abutting edges being relieved to accomodate the plungers.

* * * * *

UNITED STATES PATENT AND TRADEMARK OFFICE
CERTIFICATE OF CORRECTION

PATENT NO. : 4,581,055
DATED : April 8, 1986
INVENTOR(S) : Kenneth L. Bratton

It is certified that error appears in the above-identified patent and that said Letters Patent are hereby corrected as shown below:

> Assignee on cover sheet should read --Emhart Industries, Inc.-- and not "Emhart Corporation".

Signed and Sealed this

Second Day of December, 1986

*Attest:*

DONALD J. QUIGG

*Attesting Officer*  *Commissioner of Patents and Trademarks*